(12) United States Patent
Brongersma et al.

(10) Patent No.: US 9,507,064 B2
(45) Date of Patent: Nov. 29, 2016

(54) DIELECTRIC METASURFACE OPTICAL ELEMENTS

(71) Applicant: The Board of Trustees of the Leland Stanford Junior University, Palo Alto, CA (US)

(72) Inventors: Mark L. Brongersma, Menlo Park, CA (US); Dianmin Lin, Los Altos, CA (US); Pengyu Fan, Stanford, CA (US); Erez Hasman, Hadera (IL)

(73) Assignees: The Board of Trustees of the Leland Stanford Junior University, Palo Alto, CA (US); TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 14/810,229

(22) Filed: Jul. 27, 2015

(65) Prior Publication Data
US 2016/0025914 A1  Jan. 28, 2016

Related U.S. Application Data

(60) Provisional application No. 62/029,534, filed on Jul. 27, 2014.

(51) Int. Cl.
*G02B 5/30* (2006.01)
*G02B 5/18* (2006.01)
(Continued)

(52) U.S. Cl.
CPC ............. *G02B 5/1833* (2013.01); *G02B 1/002* (2013.01); *G02B 5/001* (2013.01)

(58) Field of Classification Search
CPC ...... G02B 5/1833; G02B 1/002; G02B 3/00; G02B 5/001; G02B 5/18; G02B 5/3083; G02B 5/32; Y10S 977/755; Y10S 977/762; Y10S 977/764; Y10S 977/814; Y10S 977/819; Y10S 977/834

USPC ............ 359/485.05, 487.03, 489.06, 489.07; 977/755, 762, 764, 814, 819, 834

See application file for complete search history.

(56) References Cited

U.S. PATENT DOCUMENTS

| | | | | | |
|---|---|---|---|---|---|
| 6,465,132 | B1 * | 10/2002 | Jin | ........................ | C01B 3/0031 313/311 |
| 8,477,408 | B2 * | 7/2013 | Li | ........................... | G02F 1/292 359/319 |

(Continued)

FOREIGN PATENT DOCUMENTS

| WO | WO2014039487 | | 3/2014 | | |
|---|---|---|---|---|---|
| WO | WO 2014062615 A3 * | 6/2014 | ........... | G03H 1/0476 |

OTHER PUBLICATIONS

Ni et al., "Ultra-thin, planar, Babinet-inverted plasmonic metalenses", Light: Science & Applications (2013) vol. 2, pp. 1-6.*

(Continued)

*Primary Examiner* — Frank Font
(74) *Attorney, Agent, or Firm* — Lumen Patent Firm

(57) ABSTRACT

A dielectric gradient metasurface optical device provides optical wavefront shaping using an ultrathin (less than 100 nm thick) layer of nanoscale geometric Pancharatnam-Berry phase optical elements deposited on a substrate layer. The optical elements are nanobeams composed of high refractive index dielectric material. The nanobeams have uniform size and shape and are arranged with less than 200 nm separations and spatially varying orientations in the plane of the device such that the optical device has a spatially varying optical phase response capable of optical wavefront shaping. The high refractive index dielectric material may be materials compatible with semiconductor electronic fabrication, including silicon, polysilicon, germanium, gallium arsenide, titanium dioxide, or iron oxide.

5 Claims, 14 Drawing Sheets

(51) Int. Cl.
*G02B 5/00* (2006.01)
*G02B 1/00* (2006.01)

(56) References Cited

U.S. PATENT DOCUMENTS

| | | | | |
|---|---|---|---|---|
| 8,681,428 | B1* | 3/2014 | Brown | G02B 1/002 |
| | | | | 351/159.02 |
| 8,848,273 | B2* | 9/2014 | Yu | G02F 1/01 |
| | | | | 359/238 |
| 8,958,141 | B1* | 2/2015 | Brown | G02B 1/002 |
| | | | | 359/326 |
| 2009/0122402 | A1* | 5/2009 | Shemo | G02B 5/3025 |
| | | | | 359/486.02 |
| 2010/0002324 | A1* | 1/2010 | Rozhin | B82Y 20/00 |
| | | | | 359/896 |
| 2010/0165276 | A1* | 7/2010 | David | C08J 7/123 |
| | | | | 349/122 |
| 2010/0165431 | A1* | 7/2010 | Li | G03H 1/02 |
| | | | | 359/32 |
| 2010/0253997 | A1* | 10/2010 | Li | G02F 1/292 |
| | | | | 359/319 |
| 2010/0313875 | A1 | 12/2010 | Kennedy | |
| 2011/0249322 | A1* | 10/2011 | Wang | B82Y 20/00 |
| | | | | 359/344 |
| 2011/0321204 | A1* | 12/2011 | Karaki | B82Y 20/00 |
| | | | | 850/32 |
| 2013/0208332 | A1* | 8/2013 | Yu | G02F 1/01 |
| | | | | 359/240 |
| 2013/0344290 | A1* | 12/2013 | Yu | G02B 1/118 |
| | | | | 428/142 |
| 2014/0085693 | A1* | 3/2014 | Mosallaei | G02B 1/002 |
| | | | | 359/107 |
| 2015/0040978 | A1 | 2/2015 | Shalaev et al. | |
| 2015/0192721 | A1* | 7/2015 | El-Kady | G02B 1/002 |
| | | | | 359/352 |
| 2015/0309218 | A1* | 10/2015 | Shalaev | G02B 1/002 |
| | | | | 359/241 |
| 2015/0331167 | A1* | 11/2015 | Escuti | G03H 1/0476 |
| | | | | 359/3 |

OTHER PUBLICATIONS

Decker et al., "High-efficiency light-wave control with all-dielectric optical Huygens' metasurfaces," May 20, 2014, arXiv:1405.5038v1 [physics.optics], accessed from http://arxiv.org/pdf/1405.5038v1.pdf.

Belardini et al., "Asymmetric Transmission and Anomalous Refraction in Metal Nanowires Metasurface," J. Europ. Opt. Soc. Rap. Public. 7, 12051 (2012).

Kildishev et al., "Planar Photonics with Metasurfaces," Science, Mar. 15, 2013: vol. 339 No. 6125.

Ni et al., "Broadband Light Bending with Plasmonic Nanoantennas," Science, vol. 335, Jan. 27, 2012, p. 427.

Bomzon et al., "Radially and azimuthally polarized beams generated by space-variant dielectric subwavelength gratings,", Optics Letters, Mar. 1, 2002, vol. 27, No. 5, p. 285.

Hasman et al., "Polarization dependent focusing lens by use of quantized Pancharatnam-Berry phase diffractive optics," Applied Physics Letters, vol. 82, No. 3, Jan. 20, 2003, p. 328.

Marrucci et al., "Pancharatnam-Berry phase optical elements for wavefront shaping in the visible domain: switchable helical modes generation," Appl Phys Lett (2006) vol. 88.

\* cited by examiner

Fig. 1A
*(PRIOR ART)*
Fig. 1B
Fig. 1C
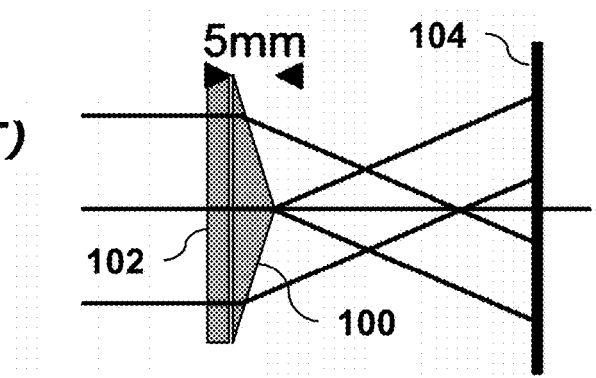
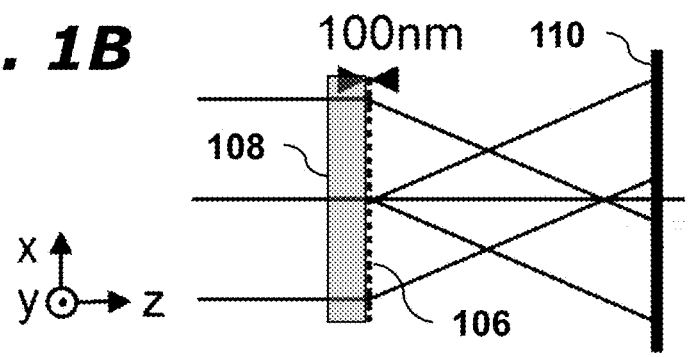
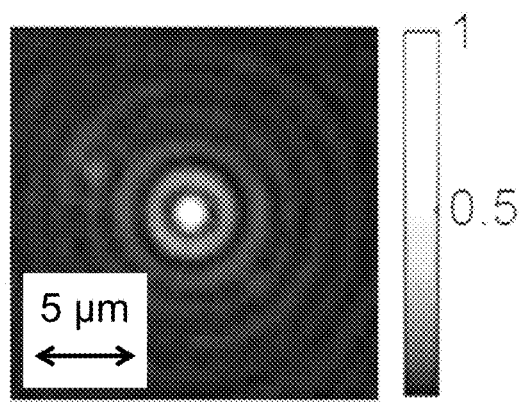

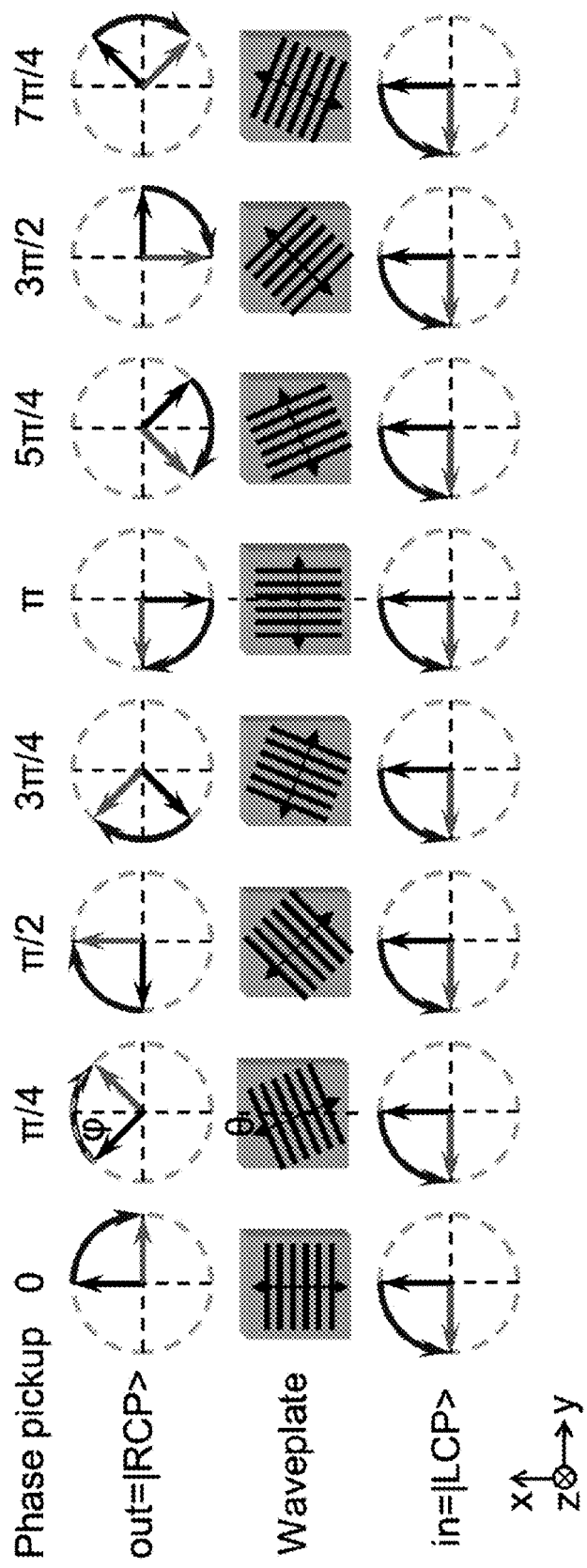

*Fig. 4C*
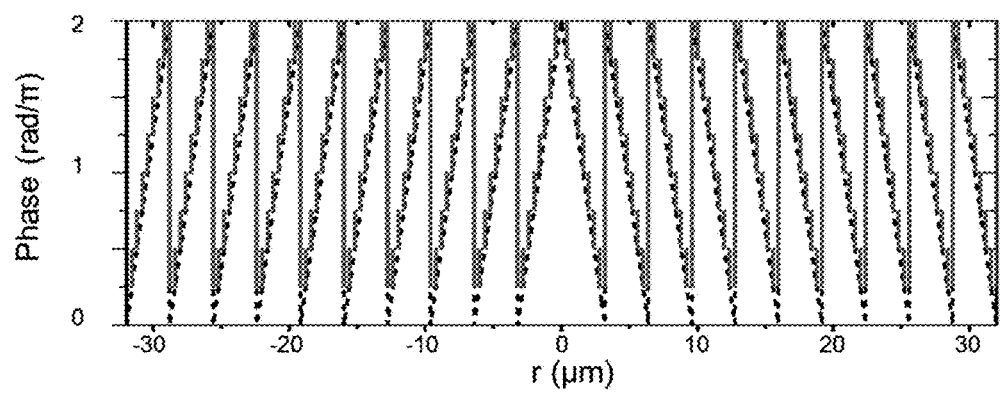
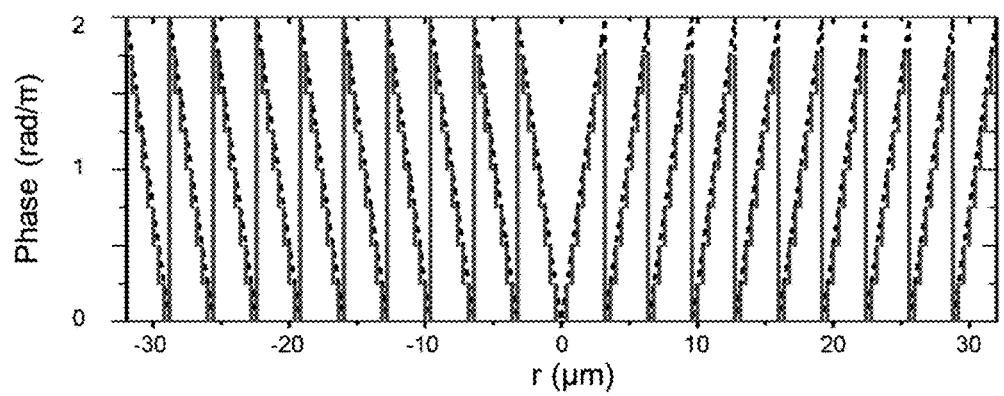
*Fig. 4D*

*Fig. 4E*
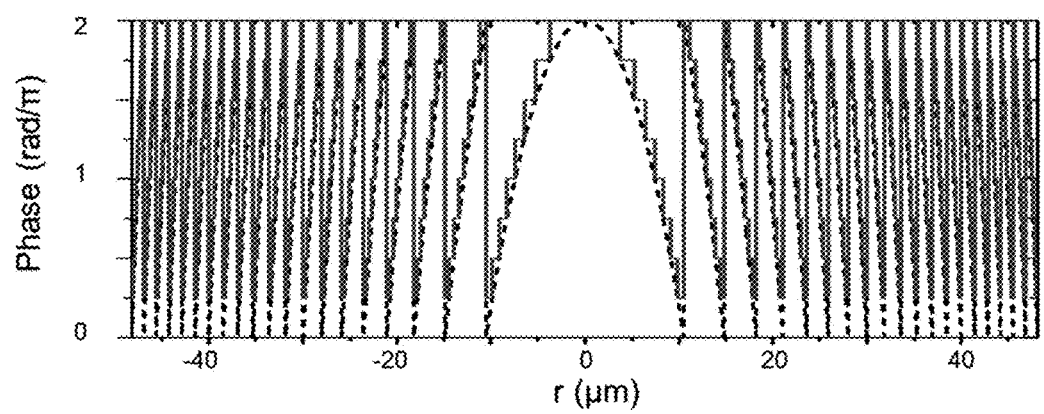
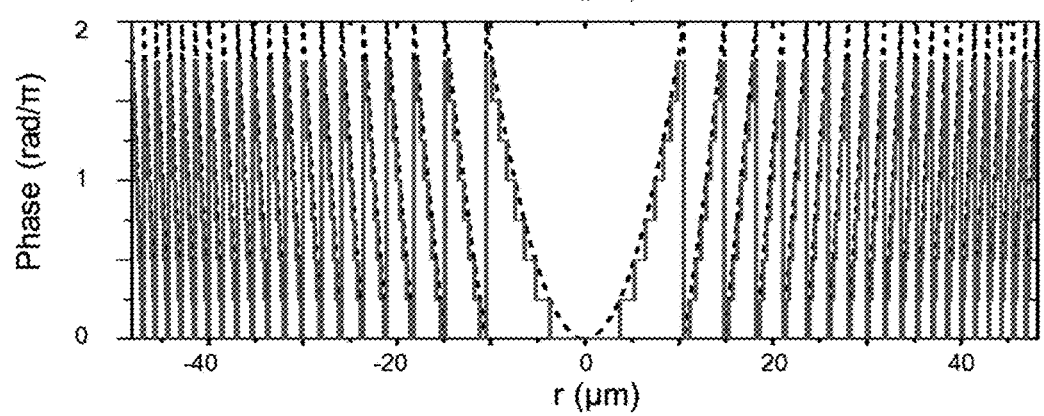
*Fig. 4F*

DIELECTRIC METASURFACE OPTICAL ELEMENTS

BACKGROUND OF THE INVENTION

Traditional optical components such as glass lenses shape the wavefront of an incident light beam using variations in thickness to create different optical path lengths. The thickness of such components is much larger than the wavelength. These traditional optical components are bulky and suffer from various well-known effects such as chromatic aberration. Advances in technology in recent decades has led to a new class of flat, ultrathin optical components based on metasurfaces. A metasurface is a quasi-two-dimensional structure composed of resonant optical antenna elements arranged to form subwavelength-patterned structures that interact strongly with light. Metasurfaces can be used to manipulate the propagation of light by spatially varying geometric parameters of the structures (e.g., antenna shape, size, orientation) to provide a spatially varying optical response that molds optical wavefronts as desired. The optical antenna elements alter light propagation by inducing localized phase discontinuities (i.e., abrupt changes of phase over a distance comparable to the wavelength of the light). These optical resonator antennas may be composed of different types of materials and may operate based upon different physical principles.

One type of metasurface optical component is space-variant (or gradient) metasurfaces capable of beam steering and focusing (i.e., manipulating an incident light beam to generate a desired optical intensity distribution in the far-field). Such optical components have been constructed from nanoscale metallic antennas. These designs, however, suffer from Ohmic losses in the metal. Typically silver and gold are selected as the plasmonic materials because they have large free-electron concentrations and high electrical conductivities. These metals, however, only work well in the infrared and microwave spectral regions. At and near visible wavelengths, they suffer from high losses arising in part from interband transitions. Also, due to the limited scattering cross sections of the antennas, these devices have efficiencies only in reflection mode. Consequently, they are unsuitable for use in transmission mode. In addition, noble metals are not compatible with the traditional semiconductor processing technologies.

Another type of metasurface is all-dielectric Huygens metasurfaces based on a single layer of dielectric silicon disks. These can provide efficient wave-front manipulation and laser pulse compression. These metasurfaces use optical resonances to impart a phase to an incident light wave. For every resonant structure, the phase delay varies spectrally across the optical resonance as well does the transmission amplitude. The resulting devices, however, can operate only over a narrow frequency range. Although the structures are transmissive, they are efficient only in the infrared spectral range, where the Si material is less absorptive. Because the frequency of the useful resonances are more sensitive to the geometry size at shorter/visible wavelengths, it becomes increasingly difficult to realize such devices in the visible range. In addition, the relatively large size of the unit cell design makes it difficult to design a optical element with high numerical aperture.

In earlier work by one of the present inventors, a Pancharatnam-Berry (PB) phase optical component was fabricated using a computer-generated space-variant subwavelength dielectric grating. Wavefront shaping based on Pancharatnam-Berry phase is fundamentally different from conventional optical-path-length approaches of standard lenses as well as other types of metasurfaces. A Pancharatnam-Berry phase optical component device does not rely on resonant effects to induce the phase shift. Instead, the phase shift results from a so-called geometric of Pancharatnam Berry phase. Such a geometric phase is achieved by having a spatial gradient in the orientation of the constituent nanostructures. The Pancharatnam-Berry phase is a phase shift that results from a manipulation of the polarization state. One characteristic feature is that the Pancharatnam-Berry phase is determined only by the geometry of the polarization path. Pancharatnam-Berry phase optical elements (PBOE) for wavefront shaping, however, have been implemented only in the mid-infrared domain, using subwavelengths inhomogeneous gratings to manipulate the polarization. In addition, these devices have only been implemented thus far in somewhat thick layers, i.e., significantly more than 100 nm.

In view of the above, there is a need in metasurface technology for new ultrathin metasurface designs and principles that provide for high efficiency visible wavelength transmission wavefront shaping with material systems that are compatible with semiconductor fabrication techniques.

SUMMARY OF THE INVENTION

In one aspect, the present invention provides flat, ultrathin optical elements based on arrays of high index semiconductor metasurfaces, such as Si. These optical elements provide alternatives to conventional refractive optical elements, such as lenses, axicons, gratings, mode converters, and light trapping layers. They may be naturally integrated with semiconductor electronics, or micro-mechanical systems. In fact, they can be made by the same processing technology and they can be fabricated on the same substrate material that electrical and mechanical structures are fabricated on.

Embodiments of the invention include ultrathin optical elements based on high index nanostructures termed optical gradient metasurfaces. They are less than 100 nm thick and can easily be fabricated and integrated with semiconductor electronics. Their realization builds upon developments in the field of Pancharatnam-Berry phase optical elements (PBOEs) that allow for a range of optical manipulations. It also builds upon ongoing efforts on semiconductor nanowire optical antennas. As key point, the inventors have discovered that it is possible to create Si nanobeam optical antenna arrays that serve as the ultrathin waveplates that are the basic optical element for PBOEs, resulting in a high efficiency broadband transmissive optical component in visible wavelengths, realized as an ultrathin layer compatible with standard semiconductor fabrication techniques.

In one aspect, the invention provides a dielectric gradient metasurface optical device having a less than 100 nm thick layer of nanoscale geometric Pancharatnam-Berry phase optical elements deposited on a substrate layer. The optical elements are nanobeams composed of high refractive index dielectric material. The nanobeams have uniform size and shape and are arranged with less than 200 nm separations and spatially varying orientations in the plane of the device such that the optical device has a spatially varying optical phase response capable of optical wavefront shaping. The spatially varying optical phase response of the optical device may function as an optical blazed grating, lens, or axicon. More generally, it may provide an arbitrary phase profile, including both the phase profiles of conventional optical elements as well as those that cannot be achieved by conventional optical elements. Preferably, the high refractive index dielectric material is silicon or polysilicon. Other high refractive index dielectric materials that may be used include germanium, gallium arsenide, titanium dioxide, or iron oxide. Preferably, the substrate is quartz, glass, or other low refractive index material. In the context of the present description a low refractive index is defined to be an index of refraction between 1 and 2, and a high refractive index is defined to be an index of refraction greater than 2.

Embodiments of the invention surprisingly achieve thickness of the device layer less that 100 nm by capitalizing on resonances in the constituent Si nanobeams. The resonances allowed the creation of very thin waveplates. In contrast with other metasurface devices, the optical resonance is used to reduce the thickness of the device and not to manipulate the phase. The optical devices of the present invention are effectively 2-D dielectric optics where the phase pickup is not dependent on the thickness but only on the orientation of the nanobeams. The present invention makes it possible to engineer the local phase pickup (between 0 to $2\pi$) without utilizing the third (thickness) dimension. The phase pickup in other metasurface devices, in contrast, depends on the thickness dimension, so they are not true 2-D optics. Although the efficiency of devices according to the invention is dependent on the depth of the nanoantennas, the phase pickup is not. Moreover, the geometric phase (Pancharatnam-Berry phase) is not dependent on the wavelength, allowing for polychromatic wavefront shaping.

The phase shift in devices according to the invention results from a so-called geometric of Pancharatnam Berry phase. Such a geometric phase is achieved by having a spatial gradient in the orientation of the constituent Si nanowire/nanobeam structures. This simply means that nanowires in different spatial locations are oriented/pointing in different directions in the plane of the optical device. The size or shape of the Si nanobeams need not change to achieve a desired phase pickup. Several same-oriented Si nanobeams with subwavelength spacing form an optical waveplate. The waveplates are essentially used as the tiles in a mosaic to form the optical device element. In each area of the device (i.e. each tile), the Si nanobeams are the same size and shape. As a result, the optical resonance properties of the Si nanowire (also called antennas as they scatter light effectively) are exactly the same, so the transmission amplitudes are exactly the same (although not 100% due to some absorption and reflection losses). By changing the orientations of the nanowires, it is possible to achieve a phase pickup in the $2\pi$ range. This phase pick up may be achieved over a very broad band of wavelengths as the phase pickup does not rely on a resonance.

Embodiments include arrays of high refractive index silicon nanostructures, but the principles of the present invention are not limited to silicon. Other high refractive index materials, such as semiconductors and also insulators may be used. For example, polysilicon, germanium, gallium arsenide, titanium dioxide, or iron oxide. Based on the compact form factor, the ability to grow and stack these structures using planar deposition/etching techniques, and the possibility to integrate these components with semiconductor electronics opens up a wide variety of applications. These include, e.g., imaging, sensing, light trapping in solar cells, light detrapping from LEDs, mode converters, waveguides with tailored dispersion relations, etc.

Significantly, embodiments of the invention use optically resonant high-index nanostructure to realize PBOEs and optical metasurfaces. These PBOE optical elements can perform a range of optical functions in a form factor that is much thinner than before. This allows easy fabrication and integration with semiconductor electronics and other planar technologies. It also allows for easy stacking of optical planar components. Possibly all optical applications where refractive optics are used may benefit from such devices, including optical imaging, sensing, light trapping, optical communication technology, beam steering, and thermal emission control. It also has applications in sensing, light trapping, optical communication technology, beam steering, and thermal emission control. Industries that may benefit include communications companies, optics companies, bio (sensing) companies, defense related companies and display companies.

Building upon recent advances in the realization of high-index dielectric antennas as well as upon Pancharatnam-Berry phase optical elements (PBOEs), the present invention provides easy-to-fabricate and highly-efficient transmissive devices. Si nanowires (in contrast to the nanodisks) are anisotropic, i.e. long in one direction and short in the other directions. This gives rise to the different optical behavior for light that is polarized along (transverse magnetic, TM) or orthogonal to the nanowire axis. This is the optical birefringence that is used to create a waveplate. The optical resonances that are naturally supported by high refractive index nanowires enhance the birefringence effect.

In preferred embodiments, a nanobeam and the space between two adjacent nanobeams only occupies just 200 nm in the horizontal plane of the device. By the nature of the geometric phase, a smaller footprint of the nanobeams/waveplates enables one to change optical phase across a surface more rapidly. This in turn enables the creation of higher numerical aperture lenses and allows one to more rapidly vary the optical phase (i.e., a greater flexibility in creating any desired optical component.

Significantly, the devices according to the invention achieve broadband wavefront shaping in visible frequencies range. Moreover, the devices achieve this at high efficiency in transmission mode.

BRIEF DESCRIPTION OF THE DRAWINGS

FIG. 1A is a schematic cross-sectional diagram of a conventional polished dielectric axicon with a 3-dimensional conical surface mounted on a substrate.

FIG. 1B is a schematic cross-sectional diagram showing a DGMOE axicon with a patterned, 100-nm-thin layer of poly-silicon deposited on a quartz substrate, according to an embodiment of the present invention.

FIG. 1C shows the transversal distribution in the x-y plane of Bessel beam intensity generated by a DGMOE of axicon, according to an embodiment of the present invention.

FIG. 1J is a schematic diagram illustrating examples of the action a half-waveplate can have on an incident LCP beam, according to an embodiment of the present invention.

FIG. 4C shows the discretized and continuous phase profiles of a DGMOE axicon for illumination of the axicon with left circular polarized light, according to an embodiment of the present invention.

FIG. 4D shows the discretized and continuous phase profiles of a DGMOE axicon for illumination of the axicon with right circular polarized light, according to an embodiment of the present invention.

FIG. 4E is a graph of the discretized and continuous phase profile of a DGMOE lens of FIG. 4A designed for illumination with RCP light, according to an embodiment of the present invention.

FIG. 4F is a graph of the discretized and continuous phase profile of a DGMOE lens of FIG. 4A designed for illumination with LCP light, according to an embodiment of the present invention.

DETAILED DESCRIPTION

Figure 1D:
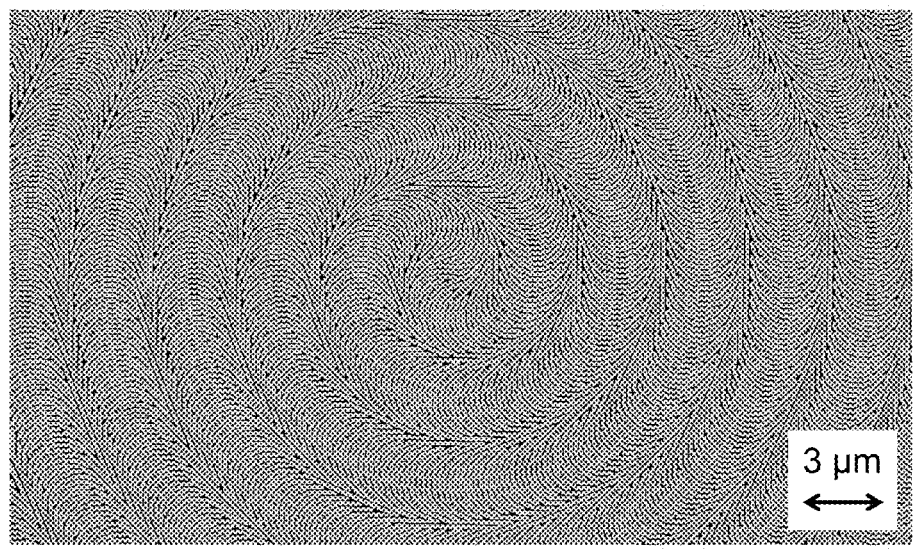
FIG. 1D is an SEM image of a fabricated DGMOE axicon, according to an embodiment of the present invention.

Embodiments of the present invention provide devices employing gradient metasurfaces, which are essentially 2-dimensional optical elements capable of manipulating light by imparting local, space-variant phase-changes on an incident electromagnetic wave. These surfaces have previously been constructed from nanometallic optical antennas and high diffraction efficiencies have been limited to operation in reflection mode. The present invention provides a realization of dielectric gradient metasurface optical elements (DGMOEs) capable of achieving high efficiencies in transmission mode at visible wavelengths. Embodiments include ultrathin gratings, lenses, and axicons that may be realized by judiciously patterning a 100-nm-thin Si layer into a dense arrangement of Si nanobeam-antennas. By fabricating these gradient metasurfaces with silicon and other semiconductor materials, they can be integrated with electronic, electrooptic, and electromechanical devices using mature semiconductor fabrication technologies.

PB phase based wavefront shaping results from a geometric gradient associated with a closed loop traverse upon the Poincare sphere. PB phase pickups result from space-variant polarization manipulations as opposed to the propagation phase that requires the traversal of a certain thickness of material. Consequently, wavefront shaping using PB phase provides a basis to realize ultrathin (sub-λ) optical elements according to the present invention. PBOEs are composed of a collection of waveplate elements (e.g., nanobeams) arranged such that their fast-axis orientations vary with spatial position in the plane of the device. Specific optical functions correspond to particular spatial orientation patterns. For example, by tiling a surface with half-waveplates arranged with their fast-axis orientations according to a function $\theta(x,y)$, an incident circular polarized light beam will be fully transformed to a beam of opposite helicity and imprinted with a geometric phase equal to $\phi_g(x,y)=\pm 2\theta(x,y)$. The fast-axes of the waveplate elements are selected to have local orientations between 0 and $\pi$, so that phase pickups cover the full 0-2$\pi$ range while maintaining equal transmission amplitude for the entire optical component. This provides full control over the wavefront, and it allows for the realization of many types of phase optical elements. To simplify implementation, a continuous phase function can be approximated using discrete waveplate orientations. In the examples discussed herein, 8 orientations are used, which provide a high theoretical diffraction efficiency of 95%. According to embodiments of the invention, efficient transmissive DGMOEs operating in the visible spectral range can be constructed from judiciously arranged waveplates realized using resonant Si nanobeam antennas.

Conventional waveplates are made by polishing naturally-occurring birefringent crystalline materials, such as quartz or calcite. The index of refraction in such birefringent materials is higher or lower for incident light polarized along the slow or fast axes, respectively. Birefringent materials may also be engineered by etching high-spatial-frequency gratings consisting of deep-subwavelength, high aspect-ratio grooves into a high-index material. Although PBOEs operating in the mid-infrared have been made from such form-birefringent materials, the generation of form-birefringent waveplates in the visible spectral range has remained a challenging problem. The present invention solves this problem by creating optical resonances in an array of low aspect-ratio (about 1:1) Si nanobeams tailored to realize very thin waveplates and DGMOEs.

FIG. 1A is a schematic diagram of a conventional polished dielectric (e.g., glass) axicon 100 with a 3-dimensional conical surface mounted on a substrate 102. The conventional axicon is shown focusing light into Bessel beam. It has 3D conical radial shape, and the thickness is on the order of several millimeters. An axicon is used to create a non-diffracting Bessel beam along the element's optical axis, as depicted by the rays in the figure which impinge upon an image plane 104. Axicons find widespread application in a range of medical, optical trapping, scanner, and alignment applications. As with conventional lenses that rely on a propagation phase, their minimum thickness is typically at least a few millimeter.

In contrast, FIG. 1B is a schematic diagram showing a DGMOE axicon with a patterned, 100-nm-thin layer of poly-silicon 106 deposited on a quartz substrate 108, according to an embodiment of the invention. The patterned layer 106 is comprised of thousands of Si nanobeam antennas with subwavelength spacings and space-varying orientations. As an illustrative example, a fabrication process of DGMOEs begins with the deposition of a 100-nm-thick intrinsic poly-silicon film onto a quartz substrate using low-pressure chemical vapor deposition (LPCVD) at 620° C. The complex (real and imaginary) refractive index of the deposited poly-silicon film is characterized by a Spectroscopic Ellipsometer (Woollam, M2000) and is shown in FIG. 1F. The associated intrinsic absorption coefficient of bulk poly-Si as calculated from the complex refractive index is shown in FIG. 1G. Electron beam lithography and standard reactive-ion etching (HBr/Cl$_2$) techniques were employed to pattern the DGMOEs into the Si film.

Figure 1E:
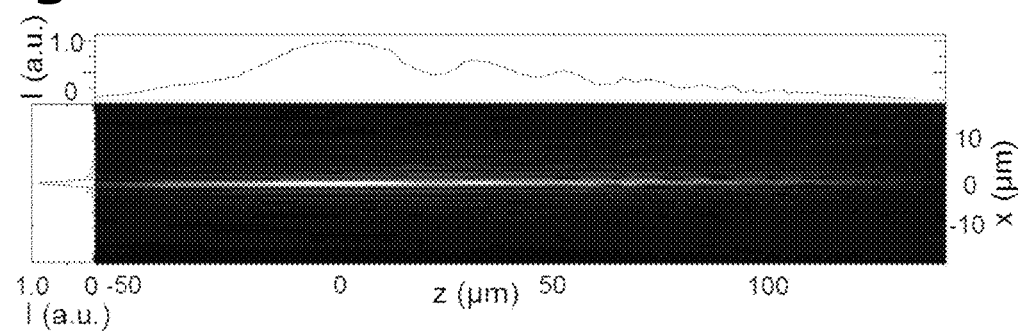
FIG. 1E shows the distribution in the x-z plane of Bessel beam intensity generated by a DGMOE of axicon, according to an embodiment of the present invention.
Figure 1F:
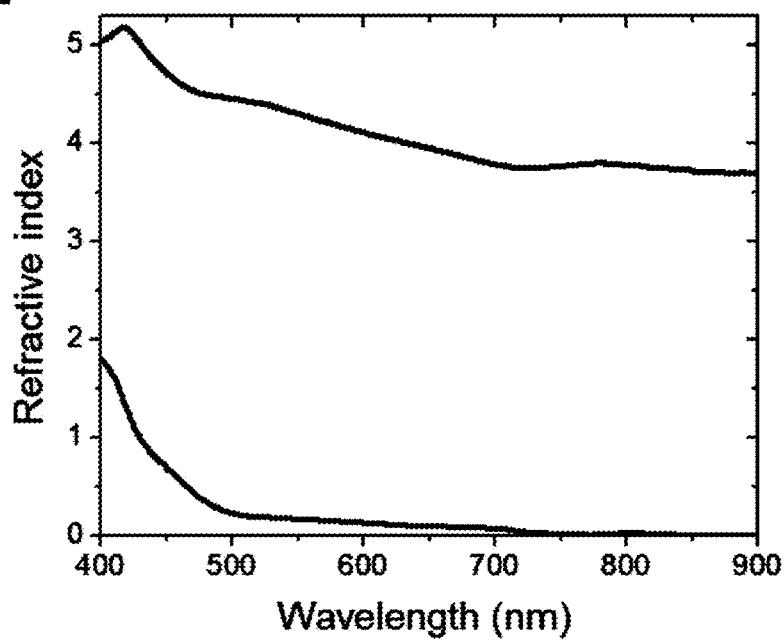
FIG. 1F is a graph of complex (real and imaginary) refractive index of deposited poly-silicon film, according to an embodiment of the present invention.
Figure 1G:
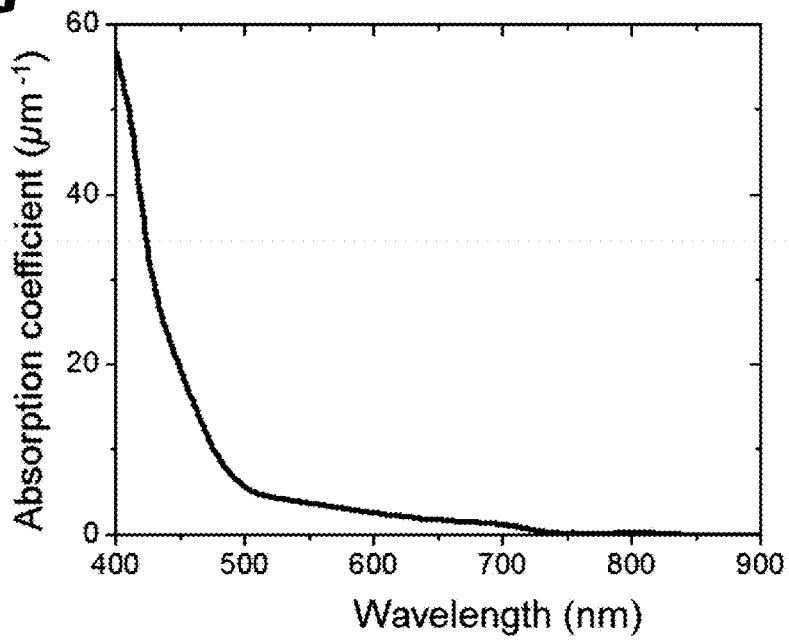
FIG. 1G is a graph of intrinsic absorption coefficient of bulk poly-Si as calculated from the complex refractive index, according to an embodiment of the present invention.

FIG. 1D is an SEM image of a fabricated DGMOE of such an axicon. The metasurface pickups the phase abruptly when light is transmitted, thus shaping the wavefront of transmitted light, focusing a light along the optical axis onto image plane 110 (FIG. 1B). When illuminated with a 550-nm-wavelength collimated Gaussian beam with left circular polarization (LCP), the DGMOE creates a non-diffracting Bessel beam behind the metasurface on the transmission side. At the same time, a right circular polarized (RCP) light beam experiences the phase profile of a plano-concave axicon and forms a Bessel beam in front of the metasurface on the reflection side. FIG. 1C shows the transversal distribution in the x-y plane of Bessel beam intensity generated by the DGMOE of axicon. FIG. 1E shows the distribution in the x-z plane, with the intensity distribution along and across the center of Bessel beam shown as insets. The profile shows a non-diffracting Bessel beam within the axicon's depth of focus. The ratio between the high-intensity central beam spot and the first ring was found to be 1:6, indicating a perfectly-crafted axicon.

DGMOEs operate over a broad wavelength range. When the incident wavelength is changed, the metasurface will pick up the same value of phase ±2θ at each location because the phase pickup is solely dependent on the orientation of fast axis θ, therefore the phase profile will remain the same for each wavelength. However, the diffraction efficiency is wavelength-dependent, which varies across the spectrum, depending on the phase retardation and transmission coefficient of the waveplate element at each wavelength.

Figure 1H:
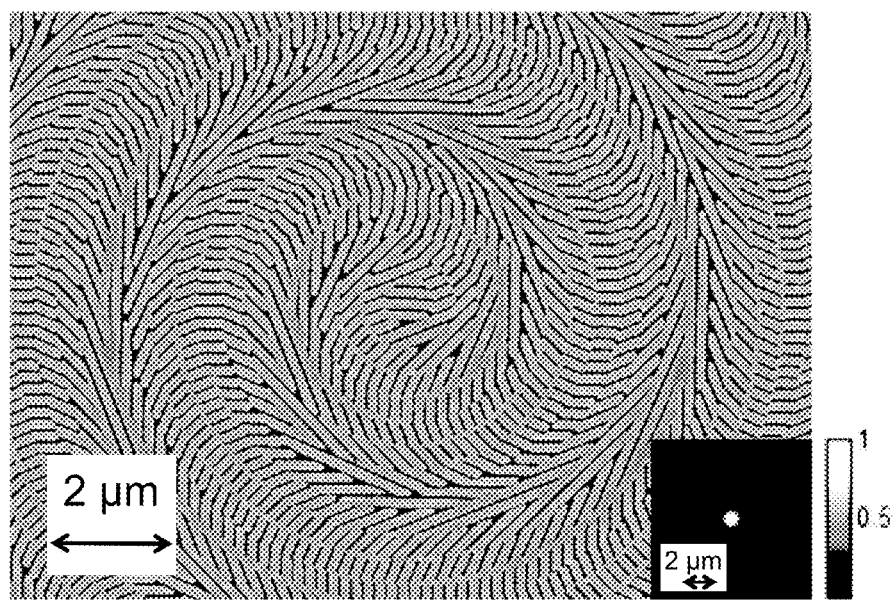
FIG. 1H is an SEM image of the central portion of the fabricated DGMOE axicon with an inset showing the generated Bessel beam, according to an embodiment of the present invention.

The generated Bessel beam profile by the DGMOE axicon at an illumination wavelength of 550 nm was just discussed above. FIG. 1H shows the generated Bessel beam at an alternative wavelength of 700 nm. Compared to the Bessel beam measured at wavelength of 550 nm, it shows a smaller depth of focus at longer wavelength as expected.

Figure 1I:
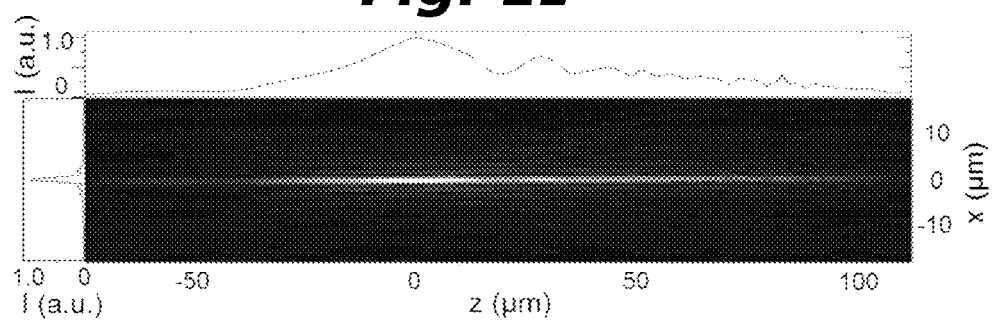
FIG. 1I shows a measured intensity profile in the x-z plane of the non-diffracting Bessel beam generated behind the axicon, according to an embodiment of the present invention.

FIG. 1H shows an SEM image of the central portion of the fabricated DGMOE axicon. The inset shows the transversal distribution of the Bessel beam generated by the DGMOE of axicon at a wavelength of 700 nm. FIG. 1I shows a measured intensity profile of the non-diffracting Bessel beam generated behind the axicon in the x-z plane. The intensity profile measured along the center of Bessel beam is plotted in the inset along the optical axis and shows a smaller depth of focus than achieved at 550 nm (FIG. 1E).

Pancharatnam-Berry Optical Elements (PBOEs) are waveplate elements with space-variant fast axes. The geometric Pancharatnam-Berry (PB) phase is achieved by space-variant polarization manipulations of the waveplate elements. The relative rotation angle θ of the optical axis of a waveplate at a certain location (x,y) will result in a local, geometric phase pickup equal to $\phi_g(x,y)=2\theta(x,y)$ for incident LCP light, while the reversed phase is produced for the opposite helicity of incident light (i.e. $\phi_g=-2\theta$). For an arbitrary incident plane wave $|E_{in}\rangle$ propagating through a PBOE, the transmitted light comprises of three polarization orders, $$|E_{out}\rangle=\sqrt{\eta_E}|E_{in}\rangle+\sqrt{\eta_R}e^{i2\theta(x,y)}|R\rangle+\sqrt{\eta_L}e^{-i2\theta(x,y)}|L\rangle$$

The PB phase can be explained and visualized using a Poincare sphere. Here, we provide an intuitive description to help understand how geometric rotations of waveplate element introduce a geometric PB phase. Referring to FIG. 1J, we analyze what happens when a waveplate element with a phase retardation of π (i.e. a half-wave plate) is illuminated with an incident of LCP beam. Such an incident beam can be described by a polarization vector with equal amplitudes in the x and y directions and phase delay of π/2. The half waveplate works by shifting the phase between of the two perpendicular polarizations by π. The net result of this action is to flip the electric field directed along the slow axis and to maintain the electric field along the fast axis. This action can also be viewed as one in which the original polarization vector is flipped to its mirror image with the fast axis serving as the mirror. When considering a helical incident state in which a polarization vector that rotates in time, one can see that the action of the waveplate is to switch helicity from LCP to RCP or vice versa.

FIG. 1J provides examples of the action of a half-waveplate can have on an incident LCP beam. The bottom row is a schematic depicting the rotation of the polarization vector of an incident light beam with left circular polarization, i.e., a |LCP⟩ state. The middle row shows half-waveplate elements constructed from nanobeam arrays with their fast axis oriented at different angles θ; The top row is a schematic of polarization vectors of the transmitted light behind the waveplate elements for different phase pickups. Circular polarizations and anti-clockwise orientation angles of fast axis of waveplate are defined from the point of view of the source.

FIG. 1J at phase 0 shows the case where the electric field of an incident |LCP⟩ beam is directed upward at a certain time t=t$_0$. A quarter of an optical cycle later, the light will be directed along the negative x-direction. The action of the waveplate is to mirror both the vectors in a mirror placed in the plane of the fast axis and the propagation direction of the light. The action of this mirror is that the |LCP⟩ beam is transformed into a |RCP⟩ beam. The other phases show how the mirror action on a |LCP⟩ beam changes when the fast axes of the waveplates are rotated by an angle θ. Independent of the rotation angle, a |RCP> output beam is produced. However, the produced phase delay with respect to phase 0 is given by $\phi_g=2\theta$. For example, when $\theta=\pi/2$ the action of the waveplate is to produces a |RCP> beam that is delayed by $\phi_g=2\theta=\pi$ for incident light of LCP. As such, it will take half an optical cycle longer before the state shown in phase 0 pickup is reached.

The physical principles of ultrathin nanobeam-based waveplates used in embodiments of the invention are related to the nature of the optical resonances of individual nanobeams and their evolution when nanobeams are brought into close proximity. Subwavelength, high-index semiconductor nanostructures exhibit strong electrical and magnetic optical antenna resonances. When top-illuminated, their resonant optical response is distinct for transverse-electric (TE) illumination (with the electric field polarized normal to the length of the structure) and transverse-magnetic (TM) illumination (with the electric field along the length of the structure). The different TE and TM responses result in a phase retardation in the scattered fields produced by the TE and TM polarizations of light. To optimize the phase delay, one can use the fact that near optical resonances there is a rapid progression of the phase delay with increasing frequency. For example, an individual 120-nm-wide and 100-nm-high Si nanobeam supports a strong resonance and a substantial phase retardation in our target wavelength-range of interest (visible to near-infrared). This resonant behavior and the accompanied phase-retardation between the orthogonal polarizations is retained in an array of closely-spaced nanobeams.

Figure 2A:
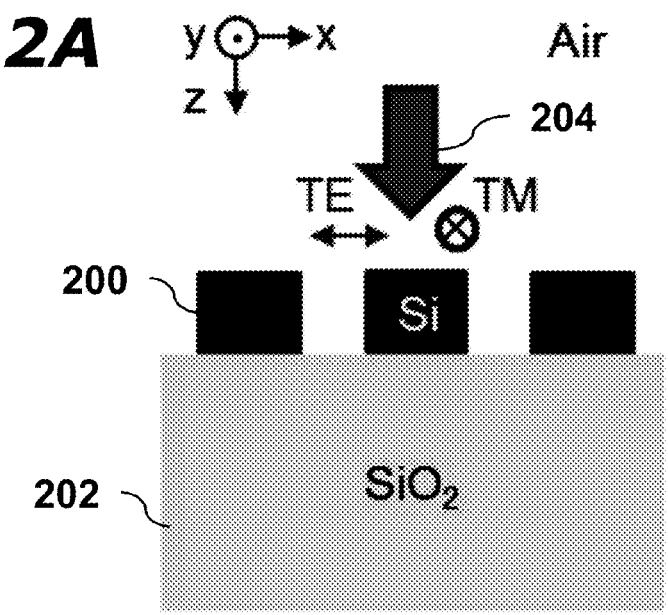
FIG. 2A is a schematic cross-sectional diagram of an ultrathin waveplate element, according to an embodiment of the present invention.
Figure 2B:
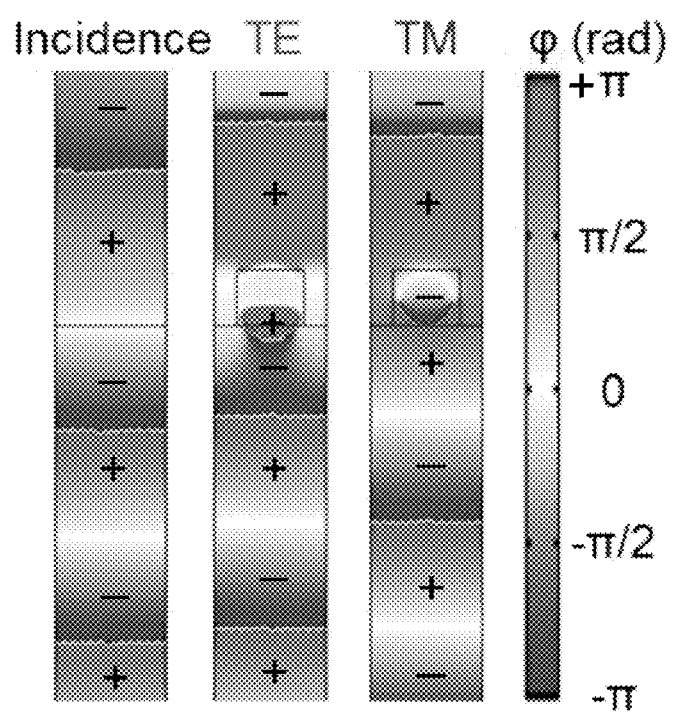
FIG. 2B illustrates phase wavefronts for TE and TM polarized light upon transmission through a metasurface of Si nanobeams, according to an embodiment of the present invention.

FIG. 2A presents a schematic cross section of an ultrathin waveplate element according to an embodiment of the invention. An array of silicon nanobeams 200 are fabricated on a substrate 202 and arranged into a periodic array with a subwavelength beam-spacing of 200 nm. Finite element simulations indicate that the wavefront for a TE-polarized light beam 204 at 550 nm is delayed by $0.14\pi$ as compared to the wavefront in the absence of the nanobeams. The wavefront for TM-polarized light is delayed even further to $1.15\pi$. As a result, the phase retardation between the two orthogonal polarizations is about $\pi$, i.e. half a wavelength. Based on the analysis above, this nanobeam array can be viewed as a half waveplate with its fast axis perpendicular to the length of the nanobeams. FIG. 2B illustrates phase wavefronts for TE and TM polarized, 550-nm-wavelength light upon transmission through a metasurface of 120-nm-wide Si beams. A $\pi$ phase retardation between two polarizations is observed. The incident wave without the Si beams is shown for reference.

Figure 2C:
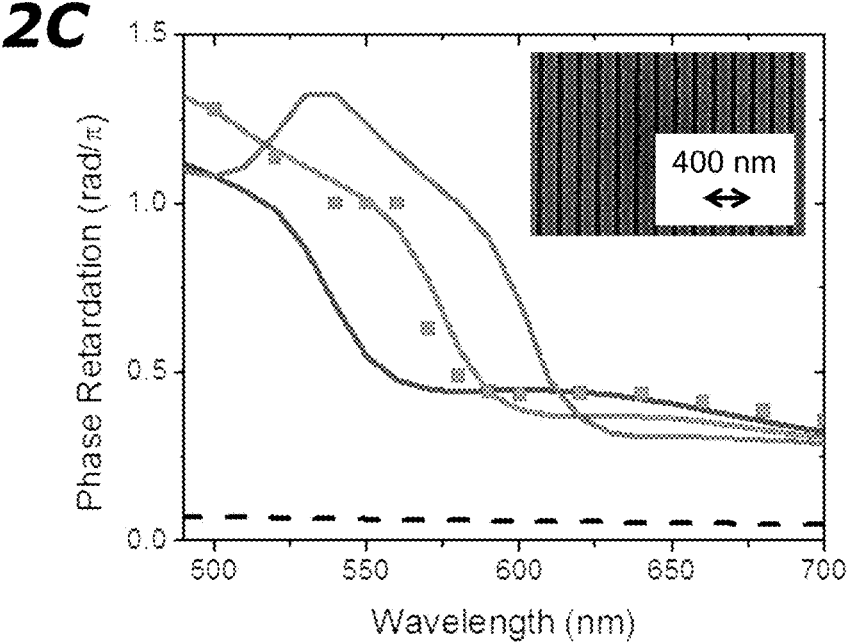
FIG. 2C is a graph of simulated spectra of the phase retardation of a TM-polarized wave with respect to TE-polarized wave for nanobeam-arrays with beam widths of 100 nm, 120 nm, 140 nm, according to an embodiment of the present invention.

FIG. 2C shows simulated spectra of the phase retardation of a TM-polarized wave with respect to TE-polarized wave for nanobeam-arrays with beam widths of 100 nm, 120 nm, 140 nm, with the same thickness of 100 nm and duty cycle of 60%. By sweeping the wavelength from 490 nm to 700 nm in simulations, the phase retardation of the waveplate varies from $0.4\pi$ to $1.2\pi$. The substantial swing in the phase retardation is attributed to the fact that the nanobeams in the array support a strong fundamental resonance under TE illumination and only a very weak second-order resonance under TM illumination. As a comparison, the phase retardation spectrum of a 100-nm-thick calcite film (dash) is shown. It is a comparatively small, virtually wavelength-independent phase retardation of $0.063\pi$. Measurements of the phase retardation (squares) obtained with an array of 120-nm-beams shows good agreement with the simulations. SEM image of the fabricated array is shown as an inset.

Figure 2D:
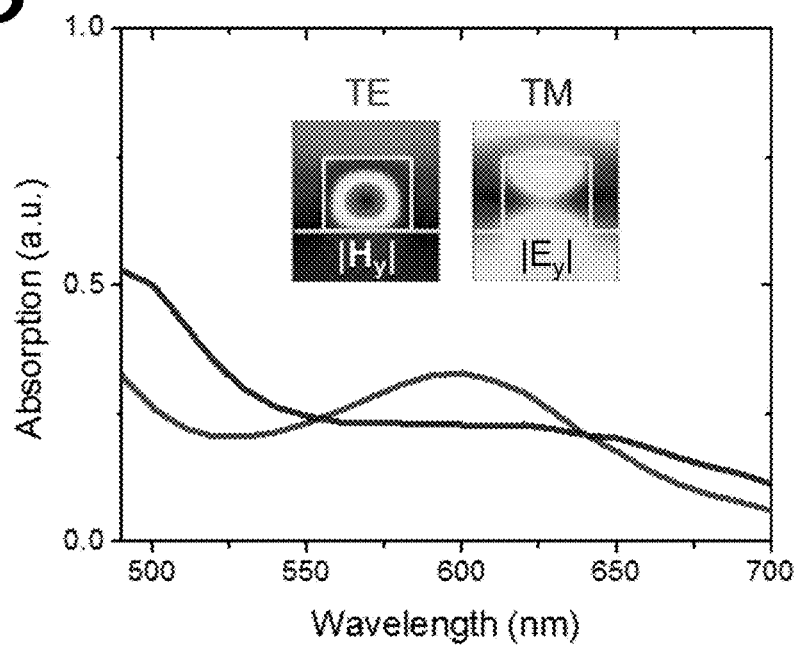
FIG. 2D is a graph of simulated absorption spectra of a nanobeam array under TE and TM polarized illumination, according to an embodiment of the present invention.

FIG. 2D shows simulated absorption spectra of the nanobeam array with 120-nm-wide beams, under TE and TM polarized illumination. The resonant response of the array that leads to energy storage in the nanobeams can be seen in the absorption spectra. Insets show the magnetic field distribution $|H_y|$ for TE and the electrical field distribution $|E_y|$ of TM illumination at a wavelength of 600 nm. The order of the resonance is determined by the number of field maxima inside the nanobeam that can be seen in the field plots.

The absorption spectra of FIG. 2D show a noticeable peak in the TE spectrum exactly in the spectral region where the retardation phase of waveplate increases with decreasing wavelength. This peak can be understood by approximating the beam array as a uniaxial crystal with effective optical properties. This approximation holds in the limit where the normalized period $P/\lambda \ll 1$ and the normalized thickness $t/\lambda \gg 1$. This is useful when $P/\lambda < 1/\{\max(n_1, n_2)+n_1 \sin(\psi)\}$ where $n_1$ and $n_2$ are the indices of the super and substrates for the array and $\psi$ the incident angle of an incoming beam of light. Grating theory shows that this condition ensures that only zeroth transmitted and reflected orders can propagate. For our DGMOE patterned on a quartz substrate (n=1.45) and taking $\psi=\pi/2$ to allow for any desired angle of incidence, this implies that $P/\lambda < 1/2.45 \approx 0.41$. This condition allows for the beams to be sufficiently large to support strong optical resonances that can be built into the effective optical properties of the array. When the optical properties of a uniaxial crystal features a resonance for one of the polarizations, the associated index will increase with increasing frequency on either side of the resonance (normal dispersion) and decrease in the immediate vicinity of the resonance (anomalous dispersion). Overall, there is a decrease in the index with increasing frequency when moving fully across the resonance. In our case, the strong TE resonance of the grating produces this type of decrease in the index for TE waves and not for TM waves. This results in a very strong birefringence that can be used to realize thin waveplates. With the knowledge that the resonant properties of the nanobeams control the birefringent properties of the array, as taught here, one can then engineer an array that achieves a large, desired phase retardation (e.g., $\pi$) at a different target wavelength. For example, FIG. 2C shows that the array's TE resonance and associated swing in the phase retardation can be translated spectrally by changing the beam width. It was found that larger beam widths naturally result in more red-shifted resonances.

Figure 2E:
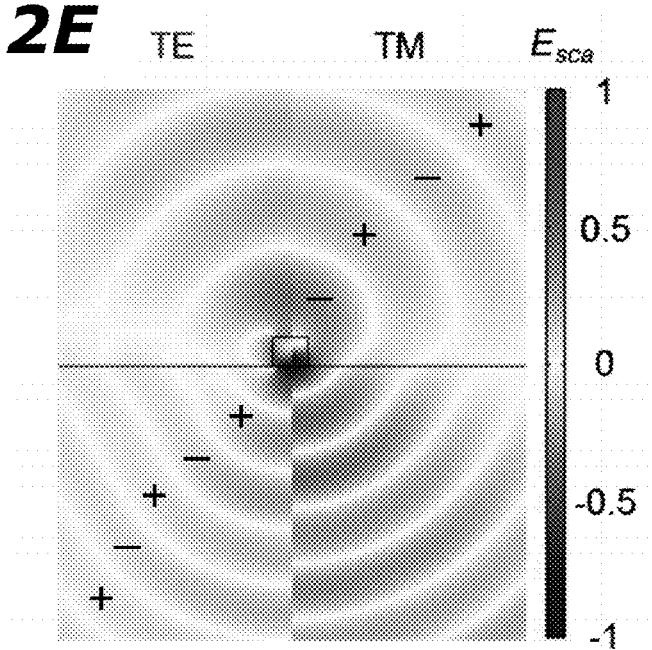
FIG. 2E shows a full field simulation of the scattered electric field from a single nanowire under TE (left) and TM (right) polarized illumination, according to an embodiment of the present invention.
Figure 2F:
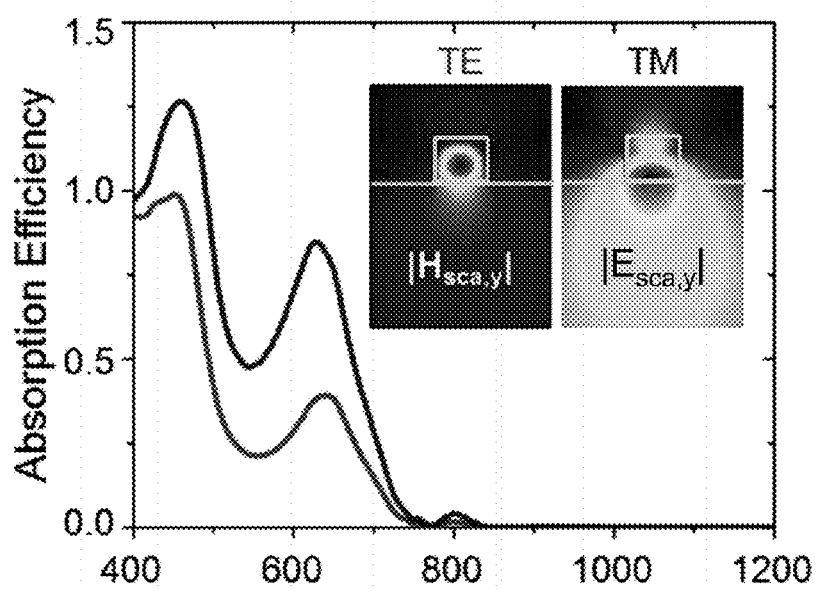
FIG. 2F is graph of the simulated absorption efficiency spectra of a single Si nanobeam under TE and TM polarized illumination, according to an embodiment of the present invention.

Dielectric optical antennas based on silicon nanobeams support leaky mode resonances, which can effectively confine light within these subwavelength, high-refractive-index nanostructures. Single nanowires can support a series of Mie resonances under illumination with transverse electric (TE) or transverse magnetic (TM) polarized light. Some of the TE and TM resonances are degenerate and others occur at distinct frequencies. One can capitalize on these resonances to elicit a substantial phase retardation in the scattered light waves produced under TE and TM illumination. An example of this is shown in FIG. 2F. A 120-nm-wide and 100-nm-high Si nanobeam fabricated on a quartz substrate (as in FIG. 2A) is illuminated with either TE or TM polarized light. The resonant response of the single Si nanobeam that leads to energy storage in the nanobeams is reflected in the absorption efficiency spectra that shows a peak near the wavelength of 630 nm. FIG. 2F shows the simulated absorption efficiency spectra of a single Si nanobeam with a width of 120 nm and thickness of 100 nm, under TE and TM polarized illumination. Insets show the scattered magnetic field distribution $|H_{sca,y}|$ for TE and the scattered electrical field distribution $|E_{sca,y}|$ of TM illumination at the resonant wavelength of the beam of 630 nm. At a wavelength of 550 nm, just above the resonance, a substantial phase difference between TE and TM scattered waves can be observed. FIG. 2E shows a full field simulation of the scattered electric field from a single nanowire under TE (left) and TM (right) polarized illumination at wavelength of 550 nm. The field distribution was obtained by means of finite element analysis solving for scattered field and the color plot is normalized to the maximum amplitude. As the beams are brought together in a dense array, both the absorption resonances and the associated phase delays between TE and TM polarized light evolve from those of the individual beams. That said, knowledge of the resonances of the individual beams can help in expediting the design of the array as the basic resonance of the nanobeams can be encoded into/recognized in the resonant optical properties of the nanobeam array. When such nanobeams are used in arrays, the resonant response of these individual building blocks is reflected in the array and gives rise to a very strong birefringence.

To make ultrathin Si nanobeam waveplates according to one embodiment, the inventors fabricated the periodic Si nanobeam-array described above and shown in the inset to FIG. 2C. These samples were characterized optically through measurements of the four Stokes polarization parameters. The measured phase retardation of this dielectric metasurface is shown by the squares in FIG. 2C and is in good agreement with optical simulations. The transmission coefficient at 550 nm, where the phase retardation is about π, is approximately 0.5. A higher transmission coefficient of 0.75 is obtained at longer wavelengths (650 nm-700 nm), closer to the bandgap of Si where the real and imaginary part of the index are lower. This leads to both a lower reflectance and absorptance in the array.

Figure 3A:
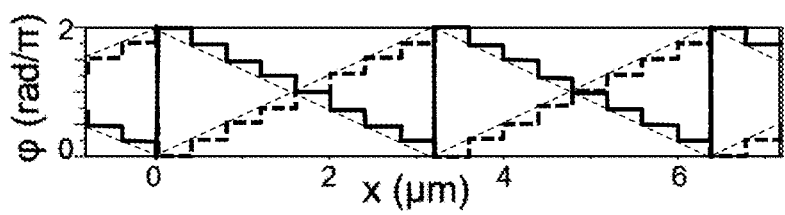
FIG. 3A is a discretized phase profile $\phi_d(x,y)$ for a DGMOE serving as a blazed grating, according to an embodiment of the present invention.

The most basic DGMOE is one that serves as a blazed diffraction grating capable of steering a light beam into several diffracted orders. The design of this element follows a strategy that can be used more generally to create more complex optical elements. First, one uses Fourier Optics to determine the phase profile that will produce a desired field distribution in the far-field. Blazed gratings feature a simple phase profile with a linear dependence of the phase on position, which either increases or decreases by $2\pi$ across one grating period. The desired phase profile is then discretized into segments that can take on a limited number of discrete phases. The discretized phase profile $\phi_d(x,y)$ for a DGMOE serving as a blazed grating with a grating period Λ of 3.2 µm is shown in FIG. 3A. The solid steps and dashed steps correspond to designs for illumination with left and right circular polarized light, respectively. In this illustrative example, there eight discrete phase levels, which according to a Fourier Optics analysis can lead to diffraction efficiencies as high as 95%.

Figure 3B:
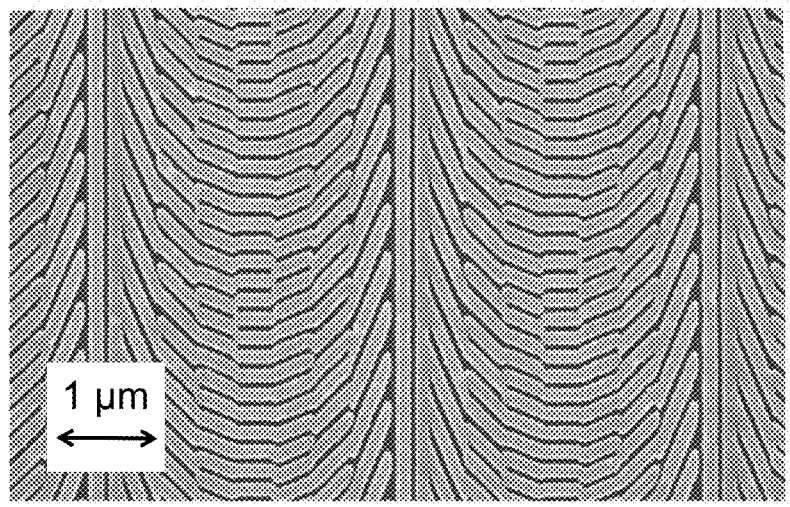
FIG. 3B is an SEM image of a fabricated DGMOE blazed grating, according to an embodiment of the present invention.

This phase profile is realized by imparting a spatially-varying geometric phase. This is accomplished by tiling a glass substrate with nanobeam-waveplates with space-variant orientations. FIG. 3B is an SEM image of the fabricated DGMOE blazed grating.

To achieve a desired far-field intensity distribution, it is important to control both the metasurface properties and the polarization state of the incident light. For an incident plane wave $|E_{in}\rangle$ with an arbitrary polarization state, one can show that the output wave $|E_{out}\rangle$ will be comprised of three polarization orders:

$$|E_{out}\rangle = \sqrt{\eta_E}|E_{in}\rangle + \sqrt{\eta_R}e^{i2\theta(x,y)}|R\rangle + \sqrt{\eta_L}e^{-i2\theta(x,y)}|L\rangle \quad (1)$$

Here, R and L denote the right- and left-handed circularly polarized unit vectors, respectively. The quantities $$\eta_E = |\tfrac{1}{2}(t_x + t_y e^{i\phi})|^2$$

$$\eta_R = |\tfrac{1}{2}(t_x - t_y e^{i\phi})\langle L|E_{in}\rangle|^2$$

$$\eta_L = |\tfrac{1}{2}(t_x - t_y e^{i\phi})\langle R|E_{in}\rangle|^2$$

provide the magnitude of the coupling efficiencies to the different polarization orders. For convenience, we use Dirac Bra-Ket our notation, where $\langle\alpha|\beta\rangle$ denotes an inner-product. The function $\theta(x,y)$ describes the spatially-variant distribution of the fast axes of the waveplates. Here, $t_x$, $t_y$ are the transmission coefficients for light polarized parallel and perpendicular to the fast optical axis, and $\phi$ is the phase retardation between these linear polarization states. From Eq. 1 it is clear that the optical materials and geometrical properties of the beams, their orientation distribution, and the incident polarization state can be used to control the diffraction properties of the array. We briefly discuss the role of these control parameters in the next paragraph.

The magnitudes of $t_x$, $t_y$, and $\phi$ determine the distribution of energy into the different polarization orders and are controlled by the optical materials and geometrical properties of the nanobeam waveplate. To realize useful optical elements, it is desired to minimize the amount of light in the $|E_{in}\rangle$ polarization order that does not experience a geometric phase and thus offers no control over the phase front. For a half wave plate with equal transmission magnitudes ($t_x=t_y$) and a π phase delay, an incident LCP or RCP beam will be 100% transformed to a beam with an opposite-handedness and pick up a geometric phase equal to $\pm 2\theta(x,y)$. The + and − take care of the fact that RCP and LCP light waves experience complementary geometric profiles. In this ideal case where all of the light emerging from a waveplate picks up a geometric phase, optical elements with unity diffraction efficiency can be created. For our presented nanobeam waveplates a π phase retardation is achieved at a wavelength of 550 nm. The grating orientation distribution $\theta(x,y)$ controls the local geometric phase and thus the exact phase profile seen by an incident light wave. Finally, the incident polarization state controls the relative intensities in the right R and left L polarization orders and thus the sign of the geometric phase pickup. Armed with knowledge on how the nanobeam structure and orientation as well as the incident polarization state govern the response of a gradient metasurface, one can implement any desired optical function. To implement the 3.2-µm-period blazed grating, we spatially arranged the fast axes orientations $\theta(x,y)$ to imprint a geometric phase that matches the desired discrete phase profile: $\phi_d(x,y) = \pm 2\theta(x,y)$.

Figure 3C:
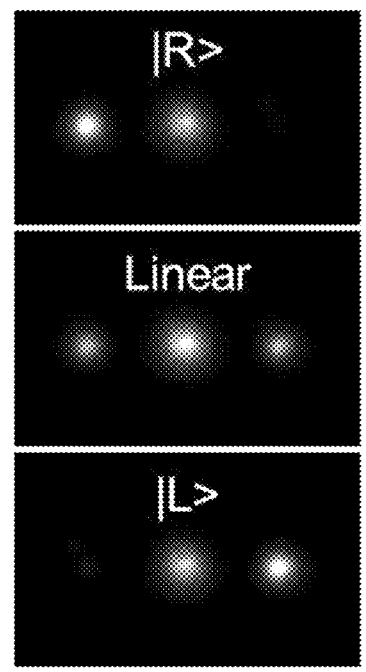
FIG. 3C depicts measured diffraction patterns from a DGMOE blazed grating, under illumination with right circular polarization, linear polarization, and left circular polarization, according to an embodiment of the present invention.

The diffraction patterns of the DGMOE blazed grating were observed on the transmission side of the element with the help of a Bertrand lens. For an incident RCP beam at a wavelength of 550 nm, part of the light changed handedness to LCP and experienced a phase pickup equal to $-2\theta(x,y)$ upon propagation through the DGMOE. As a result some light steered to the left when viewed from the location of the source, as shown in FIG. 3C, which depicts measured diffraction patterns from the DGMOE blazed grating, under illumination with right circular polarization, linear polarization, and left circular polarization at λ=550 nm.

A fraction of the light went straight through and emerged again in the incident RCP state due to the fact the transmission magnitudes, $t_x$ and $t_y$, are not perfectly equal. For LCP, part of the light steered to the opposite direction while transforming to RCP. Again a fraction of the light went straight through and did not change its state of polarization. For a linearly polarized incident beam, which can be viewed as consisting of equal amount of RCP and LCP light, light is steered in both directions. The expected polarization states of the transmitted light based on Eq. 1 were successfully verified by adding a circular polarizer on the transmission side of the metasurface. These observations demonstrate the possibility to steer light by changing the incident polarization.

Figure 3D:
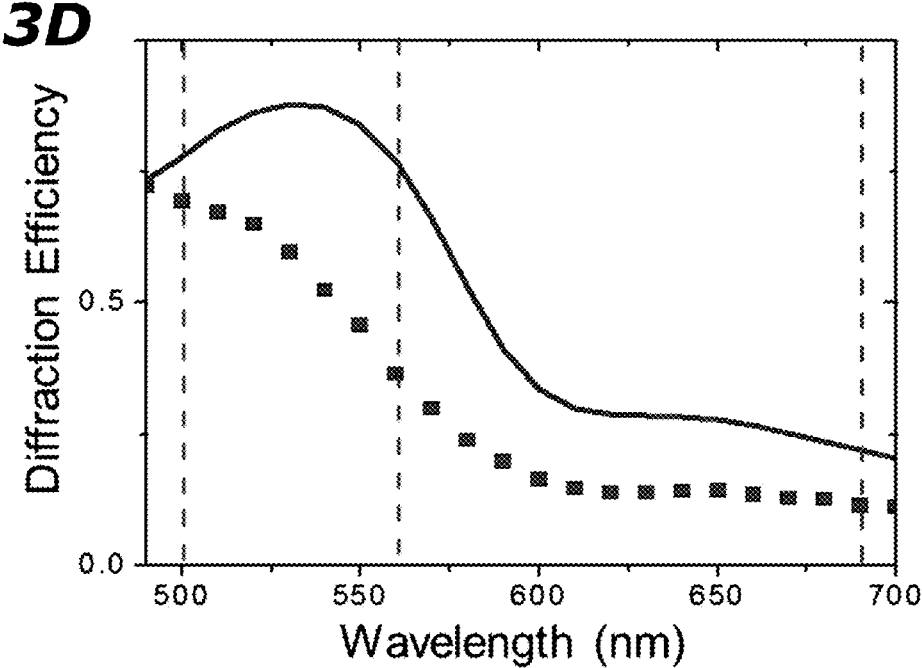
FIG. 3D is a graph of the theoretical and experimental diffraction efficiency spectra for normally-incident LCP light, according to an embodiment of the present invention.

DGMOEs can operate over a broadband wavelength range and it is thus important to understand the wavelength dependence of its optical properties. Since the geometric phase only depends on the orientation function θ, the phase profile experienced by RCP and LCP will remain the same at each wavelength. This does not imply that the diffraction properties stay the same as well. For example, the steering angle of the blazed grating α increases for longer wavelengths as this quantity is determined by the ratio of the grating period and wavelength (sin $\alpha = \lambda/\Lambda$). The diffraction efficiency also varies across the spectrum as it is linked to the wavelength-dependent transmission and phase retardation properties of the nanobeam waveplates. The diffraction efficiency $\eta_D$ is defined by the ratio of the power of circular polarized light that is been converted to opposite helicity (i.e., experiencing phase pickup) and the total transmitted power that is transmitted through the metasurface. For a well-designed blazed grating, the intensity in higher diffraction orders is very weak. As such, the total power of transmitted light is approximately equal to the sum power of zero-order intrinsic beam and first-order converted beam: $\eta_D \approx I_{1st}/(I_{1st}+I_{0rd})$. The diffraction efficiency for the grating shown in FIG. 3B was determined by measuring the light intensity of the through beam and diffracted beam with a calibrated CCD camera. FIG. 3D shows the experimental diffraction efficiency spectra for normally-incident LCP light in the wavelength range from 490 nm to 700 nm (squares). It also shows theoretical efficiencies calculated using the expressions for $\eta_E$ and $\eta_R$ given below Eq. 1 (solid curve). They were determined using the measured values of $t_x$, $t_y$, and $\phi$ and by taking into account the expected diffraction efficiency of 95% that is appropriate for an 8-level phase discretization.

Figure 3E:
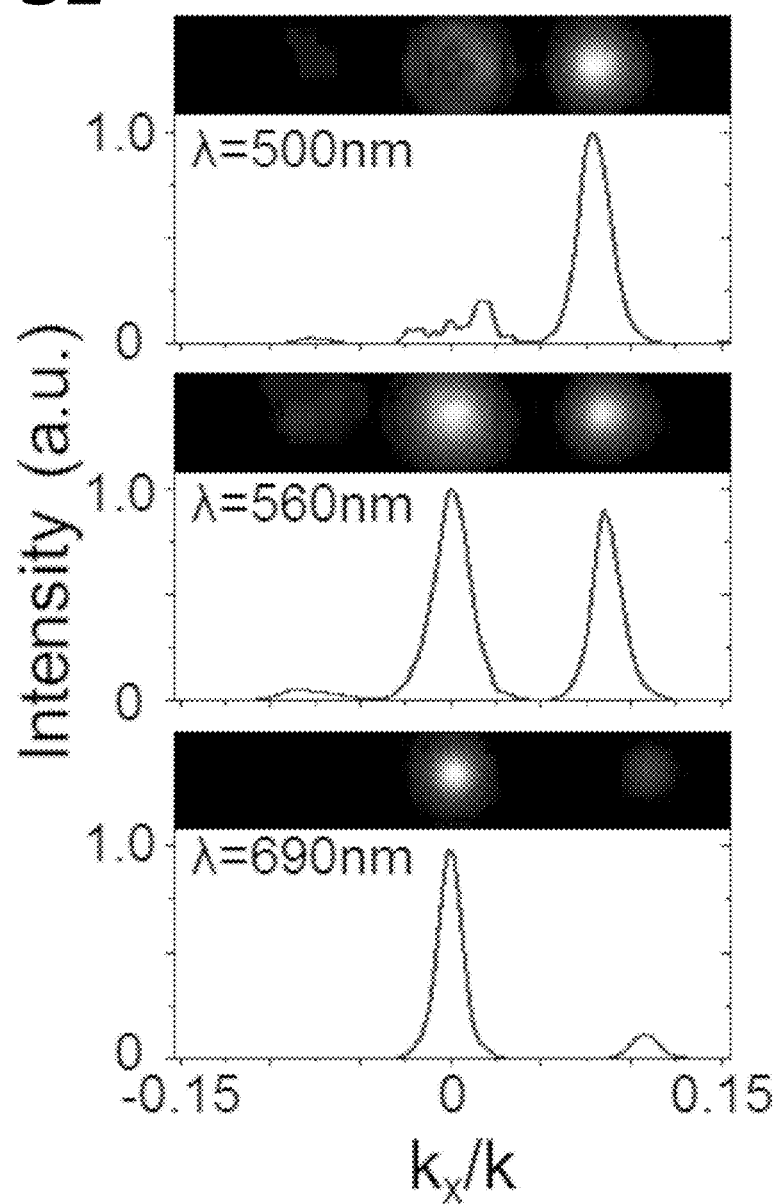
FIG. 3E shows measured diffraction patterns of the DGMOE blazed grating and associated cross sectional intensity distributions under illumination with left circular polarization at wavelengths of 500 nm, 560 nm, and 690 nm.

FIG. 3E shows measured diffraction patterns of the DGMOE blazed grating and associated cross sectional intensity distributions under illumination with left circular polarization at wavelengths of 500 nm, 560 nm, and 690 nm. At a wavelength of 500 nm, 75% of the light is steered and the intensity of the zeroth-order (i.e., straight-through-beam) is very low compared to the first diffracted order. In contrast, at λ=690 nm only a small portion of light is steered and most of the energy remains in the zeroth-order beam. The pattern also shows the expected increase in the steering angle at this longer wavelength. The overall shape of the measured efficiency spectrum qualitatively agrees with the predicted spectrum, but the measured efficiencies tend to be lower. This can be possibly be attributed to imperfections in the fabricated structure. Alternatively, it may be that the birefringent nature of the nanobeam waveplates is size-dependent (i.e., the number of parallel beams and their length in a specific area).

Figure 4A:
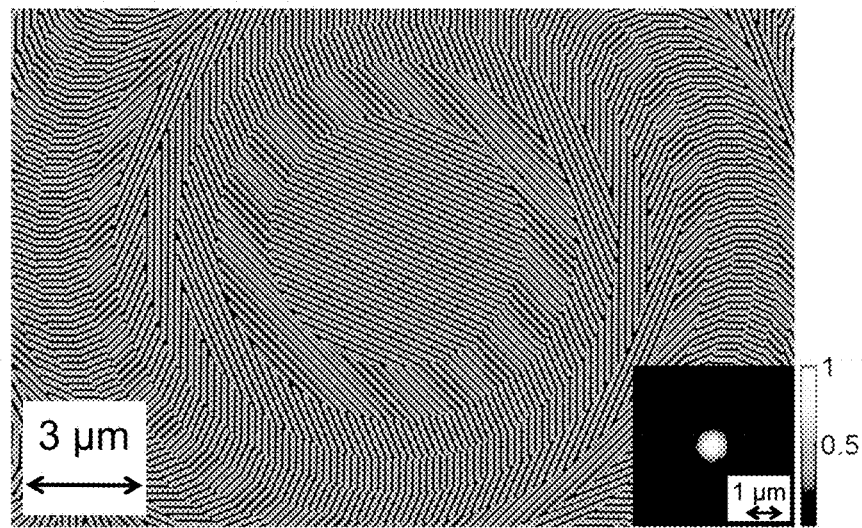
FIG. 4A is an SEM image of the central region of a DGMOE serving as a conventional lens, according to an embodiment of the present invention.

Using the design principles described above, we also fabricated a DGMOE serving as a conventional lens. A scanning electron microscope image of the central region of the lens is shown in FIG. 4A. The phase profile for this DGMOE lens again features 8 discrete levels and approximates a hyperboloidal phase profile. The entire lens has a diameter of 96 μm and was optimized for a wavelength of 550 nm and a focal length of 100 μm. At this wavelength the DGMOE lens has a Numerical Aperture (NA) of 0.43. The inset shows the 2D intensity profile in the focal plane.

Figure 4B:
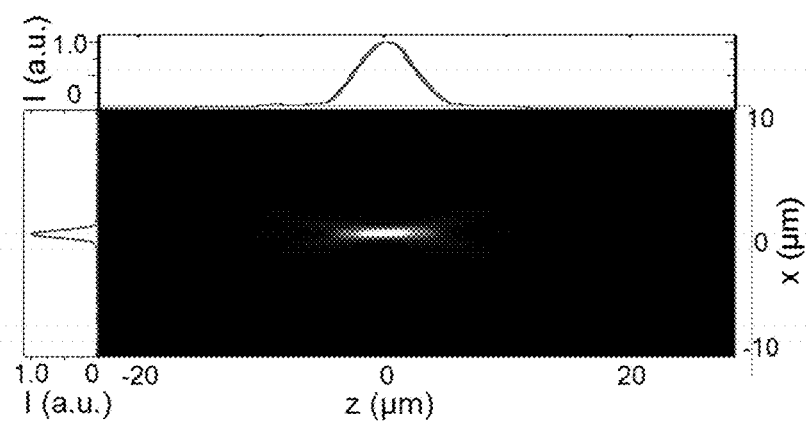
FIG. 4B shows the measured intensity distribution at the focal plane behind a DGMOE and cross sections of the intensity profile along the optical axis and through the focus, according to an embodiment of the present invention.

When the DGMOE is uniformly illuminated from the substrate side with RCP light, it concentrates light into an LCP focal spot. FIG. 4B shows the measured spatial intensity distribution at the x-z focal plane behind the DGMOE as it was captured using a confocal microscope (Nikon Eclipse C1) with a 100× objective lens. A linear cross section of the intensity profile along the optical axis and through the focus are shown as an inset. It clearly shows the focusing of light that is expected for a well-crafted lens. The size of the measured focal spot is 1.54 μm, with full-width at half-maximum of 670 nm, close to the diffraction limited focal spot size. The intensity distributions along the optical axis and through the focus are shown along the vertical and horizontal axes.

The geometric pattern of a DGMOE axicon has a series of evenly-spaced, concentric rings. Within each ring the nanobeam antennas are oriented in the same direction. There are 8 discrete levels of rotation angles for the nanobeam antennas, corresponding to 8 discrete levels of geometric phase pickup of 2π for the transmitted light, as shown in FIGS. 4C and 4D. By controlling the local orientation of nanobeam antennas, one can generate the DGMOE axicon shown in FIG. 1D, which has diameter of 64 μm and base angle β=λ/3.2 μm.

FIG. 4C shows the discretized and continuous phase profiles of DGMOE axicon for illumination of the axicon with left circular polarized light. FIG. 4D shows a reversed discretized phase profile and continuous for illumination with right circular polarized light.

The discretized and continuous phase profile of a DGMOE lens (FIG. 4A) for illumination with RCP light is shown in FIG. 4E, while the reversed phase profile appropriate for illumination with LCP light is shown in FIG. 4F.

These show an approximation of a hyperboloidal phase profile of conventional lens with 8 discrete phase levels. In general, to realize a lens with a focal length f, the phase profile at any radial location r needs to satisfy the relation below:

$$\varphi(r) = 40\pi + \frac{2\pi}{\lambda}\left(f - \sqrt{r^2 + f^2}\right)$$

At wavelength of 550 nm, the fabricated lens shown in FIG. 4A has a focal length of 100 μm and a diameter of 96 μm. Consequently, at this wavelength the DGMOE lens has a Numerical Aperture (NA) of 0.43.

The example devices described in detail above illustrate the general principles of the invention which may be used to create a wide variety of high-diffraction efficiency DGMOEs by patterning of a thin semiconductor film into smartly-arranged arrays of Si-nanobeam-antennas. These devices according to embodiments of the invention are designed using knowledge of leaky mode resonances supported by the antennas and the Pancharatnam-Berry phase. The effectiveness of using Pancharatnam-Berry phase concepts in the design of DGMOEs implies that the nanowire waveplates maintain their desired birefringent behavior, even in the limit where the waveplates are small and consist of just a few truncated nanobeams. This is reasonable as the nanobeams serve leaky resonators supporting highly localized resonances that are primarily controlled by the intrinsic beam properties (material and geometry). The design principles taught therein are generally applicable to any high-index semiconductor or insulator and can be applied at any desired wavelength in the visible and infrared, including near-IR, mid-IR and far-IR. It was found that the lowest Ohmic losses could be achieved near the semiconductor band edge. The ultrathin DGMOEs of the present invention address an increased need for low-cost, light-weight, compact, optical elements that easily be integrated into complex systems requiring assembly of optical, electronic, and mechanical components.

An important advantage of the optical devices according to the invention is that they can be fabricated using existing semiconductor fabrication techniques. This also allows integration with semiconductor electronics and other semiconductor devices.

The invention claimed is:

1. A dielectric gradient metasurface optical device comprising a less than 100 nm thick layer of nanoscale geometric Pancharatnam-Berry phase optical elements deposited on a substrate layer, wherein the optical elements are nanobeams composed of high refractive index dielectric material, wherein the nanobeams have uniform size and shape and are arranged with less than 200 nm separations and spatially varying orientations in the plane of the device such that the optical device has a spatially varying optical phase response capable of optical wavefront shaping.

2. The optical device of claim 1 wherein the high refractive index dielectric material is silicon.

3. The optical device of claim 2 wherein the high refractive index dielectric material is polysilicon, germanium, gallium arsenide, titanium dioxide, or iron oxide.

4. The optical device of claim 1 wherein the substrate is quartz or glass, or other low refractive index material.

5. The optical device of claim 1 wherein the spatially varying optical phase response of the optical device functions as an optical blazed grating, lens, or axicon.

* * * * *